United States Patent
Wu et al.

(10) Patent No.: US 7,799,233 B2
(45) Date of Patent: Sep. 21, 2010

(54) APPARATUS AND METHOD FOR ULTRASOUND TREATMENT OF AQUATIC ORGANISMS

(75) Inventors: Mei-Yin Wu, Belle Mead, NJ (US); Jun-Ru Wu, South Burlington, VT (US)

(73) Assignee: The Research Foundation of State University of New York, Albany, NY (US)

( * ) Notice: Subject to any disclaimer, the term of this patent is extended or adjusted under 35 U.S.C. 154(b) by 0 days.

(21) Appl. No.: 12/103,421

(22) Filed: Apr. 15, 2008

(65) Prior Publication Data

US 2008/0257830 A1    Oct. 23, 2008

Related U.S. Application Data

(60) Provisional application No. 60/912,254, filed on Apr. 17, 2007.

(51) Int. Cl.
*C02F 1/36* (2006.01)
*B01J 19/10* (2006.01)

(52) U.S. Cl. ............... 210/748.01; 422/128; 422/20

(58) Field of Classification Search ............ 210/748, 210/748.01–748.1; 422/20, 128; 204/193; 366/127; 367/88
See application file for complete search history.

(56) References Cited

U.S. PATENT DOCUMENTS

| | | | |
|---|---|---|---|
| 3,902,273 A | 9/1975 | Friedman | |
| 4,013,552 A | 3/1977 | Kreuter | |
| 4,065,875 A | 1/1978 | Srna | |
| 5,090,430 A * | 2/1992 | Nixon | 134/84 |
| 5,271,470 A | 12/1993 | King et al. | |
| 5,611,993 A | 3/1997 | Babaev | |
| 5,692,064 A | 11/1997 | Takagi et al. | |
| 5,693,512 A | 12/1997 | Finer et al. | |
| 5,731,265 A | 3/1998 | Hou et al. | |
| 5,805,525 A | 9/1998 | Sabol et al. | |
| 5,889,209 A | 3/1999 | Piedrahita et al. | |
| 5,930,199 A | 7/1999 | Wilk | |
| 6,691,578 B1 * | 2/2004 | Puskas | 73/648 |
| 6,719,449 B1 | 4/2004 | Lagharn, Jr. et al. | |
| 2004/0264293 A1 * | 12/2004 | Lagharn et al. | 366/127 |

FOREIGN PATENT DOCUMENTS

| | | |
|---|---|---|
| DE | 2539961 | 10/1977 |
| DE | 20117163 | 2/2002 |
| FR | 2705198 | 11/1994 |
| JP | 57132510 | 8/1982 |
| JP | 59010310 | 1/1984 |
| JP | 59012710 | 1/1984 |
| JP | 11137159 | 5/1999 |

* cited by examiner

*Primary Examiner*—Walter D Griffin
*Assistant Examiner*—Cameron J Allen
(74) *Attorney, Agent, or Firm*—Hoffman & Baron, LLP

(57) ABSTRACT

The invention provides a method of treating a target area with an ultrasound wave pattern, including: providing an ultrasound apparatus having an ultrasound wave generator operatively attached to a plurality of transducers, coupled to an immersible support and configured to emit an ultrasound wave; immersing the apparatus into a water environment; positioning the apparatus proximate to a target area to treat at least one in situ organism; and emitting a pattern of ultrasound waves from the transducers, the pattern of ultrasound waves additive in effect and emitted onto the target area to threat an in situ underwater organism.

26 Claims, 14 Drawing Sheets

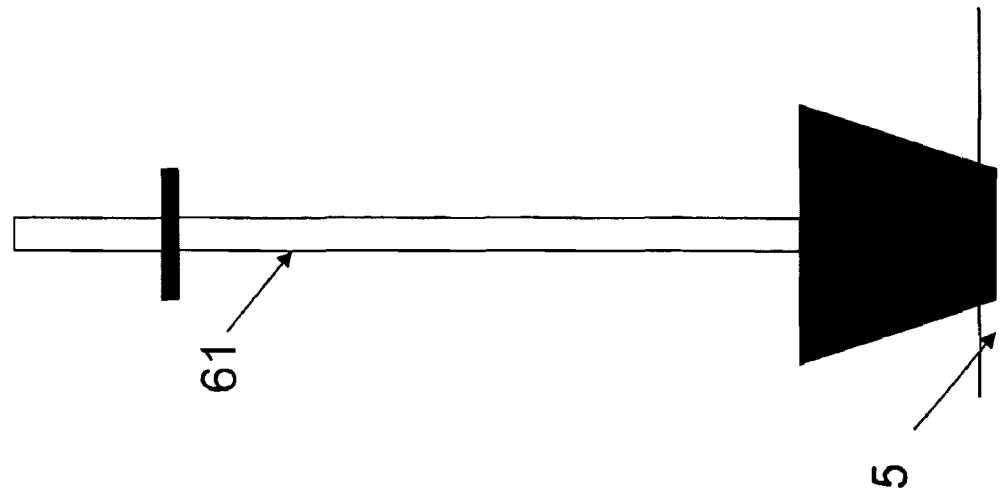
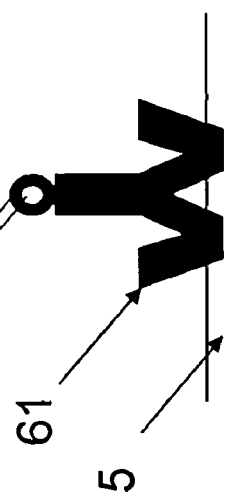
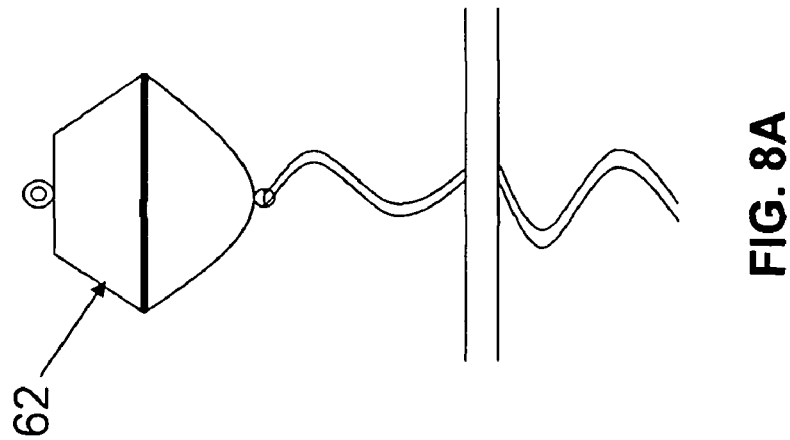
FIG. 8C
FIG. 8B
FIG. 8A

APPARATUS AND METHOD FOR ULTRASOUND TREATMENT OF AQUATIC ORGANISMS

PRIORITY CLAIM

This application claims the benefit of U.S. Patent Application No. 60/912,254 filed on Apr. 17, 2007, which is incorporated herein by reference in its entirety.

FUNDING STATEMENT

The invention was made with government support under the Lake Champlain Sea Grant, contract number NA16RG2206, awarded by a cooperative program of the University of Vermont and Plattsburgh State University of New York. The government has certain rights in the invention.

TECHNICAL FIELD OF THE INVENTION

The present invention relates generally to an apparatus and method for treating aquatic organisms with ultrasound waves. Specifically, the invention relates to an apparatus for in situ control of underwater organisms and the method of use thereof.

BACKGROUND OF THE INVENTION

Invasive species in non-native ecological systems and environments often results in overpopulation of that species such that the native species and ambient environment is thrown out of balance. The invasive species may out-compete native species for food and shelter, and may not have any natural predators to keep non-native populations in check. Once an invasive species is introduced into a non-native environment, the non-native species may quickly repopulate the area, drastically shifting the ecological balance and system. For these reasons, vast resources are invested each year in efforts to eliminate invasive plant and animal species in the United States and abroad. Previous control methods vary whether the species is microbial, animal, or plant.

The control and elimination of invasive aquatic animal species is done by methods including, for example, physically catching and removing the animals, sterilization, building mechanical barriers, or treating the water chemical dispersions, toxic bait, or various piscicides. The control of invasive aquatic plants is done, for example, by mechanical harvesting, manual removal, and chemical spraying. Each of the aforementioned methods of control and removal of invasive species has limitations in use and problems and associated with it. Some of the problems include the propagation and increase of pollutants, environmental and ecological damage, great cost, low efficiency, and overall ineffectiveness.

SUMMARY OF THE INVENTION

The present invention provides an apparatus and method of use for the treatment of in situ aquatic organisms with ultrasound waves in order to facilitate elimination thereof. The target area may include one or more organisms, including invasive species. Invasive species, as used herein, may refer to native species, non-native species which are introduced species into an environment or habitat, or noxious species which create a nuisance. Invasive species not only grow on their native range but can also expand their range to outside of their historical boundaries. Invasive species are capable to adapt into wide ranges of environmental conditions and have a high reproduction rate. The apparatus includes an immersible device which may be maneuvered through thick plant matter, shallow water, or tight spaces. The device includes a power source, function generator, power amplifier, and at least one ultrasound transducer. Optionally, the device may include an immersible support, a remote control, computer system, and/or a transport member in order to facilitate ease of use and operability.

The underwater aquatic apparatus may be immersed or otherwise submerged in a control volume of water in order to treat one or more target species or desired area. Optionally, the apparatus may be remotely controlled, for example, from a nearby boat or even an off-site facility. The apparatus may be maneuvered through the volume of water by transport members, tracks, wheels, jets, and the like in order to place the apparatus an effective distance from the target site. The apparatus may be used in order to treat or eradicate one or more target species or populations. The species may be non-native, invasive, or otherwise detrimental to the in situ site of their locale.

As the apparatus is maneuverable, robust, compact, and optionally remotely operated, the device may be used to treat a geographic location and reduce the population until a desired population is achieved. Similarly, once the objectives of one area may be realized, the device may be transported to a new location at which different parameters may be employed in order to target a different target species or area. As such, the efficiency, effectiveness, and costs of treating or eliminating target species or populations are driven down. Further, the apparatus and method avoid causing damage or pollution to the environment or in situ ecological system. Once the target organism is treated, the matter is left to decompose in the ambient environment, thus returning the nutrients of the organism into the water and the soil while maintaining the integrity of the water bed floor, shoreline, and other wildlife, plant life and organisms.

While the underwater aquatic apparatus may be employed in a control volume including, for example, a body of water and/or waterways, the aquatic apparatus may likewise be employed in, for example, swimming pools, ballast water of ships, boats, and the like, and the treatment of large control volumes of water or other liquids or solutions including those containing cosmetics, pharmaceuticals, nutraceuticals, food or beverage.

The apparatus is designed to be compact, robust, and easily maneuverable through tight spaces, thick plant matter, and shallow waters. Thus, the device can be operated where boats, road-bound vehicles, and man may be unable to travel or otherwise difficult to go. The device may be configurable to operate with a plurality of transducers in different orientations to one another, thus producing varying ultrasonic patterns to a target area or environment. Similarly, the functional parameters of the apparatus may be changed, for example, to expel a longer duration of ultrasound, a higher intensity, or varying frequencies. As such, the present invention may be used in a wide variety of environments, remote locations, on varying species and classes of plants, animals, fungi, and microorganisms in one or more control volumes of liquid.

A first aspect of the present invention provides an apparatus for in situ control of underwater organisms, the apparatus including: a function generator, for generating an electronic signal; a power amplifier, electrically coupled to the function generator, for receiving the electronic signal and amplifying the signal; a plurality of transducers, electrically coupled to the power amplifier, for converting the amplified electronic signal to a plurality of ultrasonic waves; and an immersible support, wherein the plurality of transducers are operatively coupled to the immersible support, wherein each transducer generates at least one of the ultrasound waves to provide a pattern of ultrasound waves larger than an individual ultrasound wave to thereby cover a larger in situ target area than an individual ultrasound wave.

A second aspect of the present invention provides an apparatus for in situ control of underwater organisms, the apparatus including: a function generator, for generating an electronic signal; a power amplifier, electrically coupled to the function generator, for receiving the electronic signal and amplifying the signal; a plurality of transducers, electrically coupled to the power amplifier, for converting the amplified electronic signal to a plurality of ultrasonic waves; an immersible support, wherein the plurality of transducers are operatively coupled to the immersible support, wherein each transducer generates at least one of the ultrasound waves to provide a pattern of ultrasound waves larger than an individual ultrasound wave to thereby cover a larger in situ target area than an individual ultrasound wave; and at least one transport member, attached to the immersible support to maneuver the transducers and the support.

A third aspect of the present invention provides a method of treating a target area with an ultrasound wave, including: providing an ultrasound generating apparatus having an ultrasound wave generator operatively attached to a plurality of transducers, each of the transducers configured to emit an ultrasound wave, the plurality of transducers coupled to an immersible support; immersing the apparatus into a water environment; positioning the apparatus proximate to a target area to treat at least one in situ organism; and; emitting a pattern of ultrasound waves from the transducers, the pattern of ultrasound waves additive in effect and emitted onto the target area to threat an in situ underwater organism with an ultrasound wave pattern.

The present invention will be described in association with references to drawings of embodiments and description. It will be apparent to those skilled in the art that various modifications may be made without departing from the scope of the invention.

BRIEF DESCRIPTION OF THE DRAWINGS

FIG. 8A is an embodiment of a buoy as a transport member, attachable to the apparatus for mobility.

FIG. 8B depicts an anchor attachable to the apparatus of the present invention to promote operation at a location.

FIG. 8C depicts another type of anchor attachable to the apparatus of the present invention to promote stationary operation at a location.

DETAILED DESCRIPTION OF THE INVENTION

Figure 1:
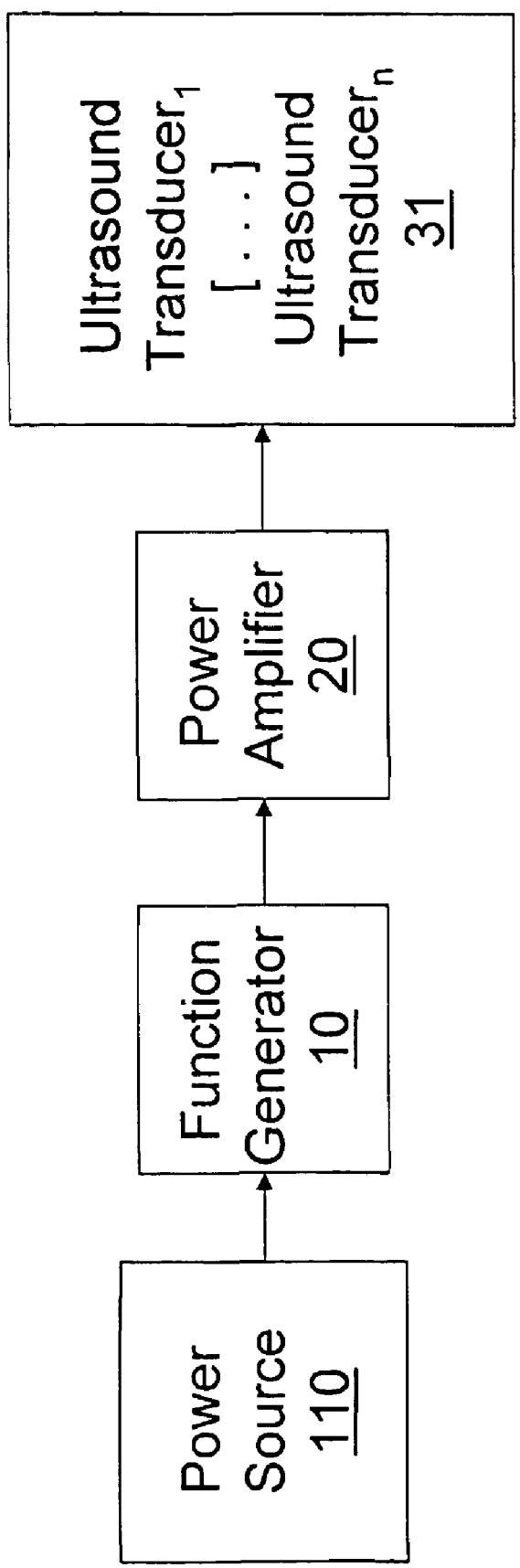
FIG. 1 is a flow chart of the electrical components of an embodiment of apparatus of the present invention.

The potential not only for continued existence of invasive populations but also expanding populations demonstrates an urgent need for a more effective approach in treatment and elimination while, at the same time, promoting ecological preservation and environmental make up. The current technology and methodology is problematic and ineffective in removing target species and populations. Hence, a need exists to solve the problem of treating, controlling, and eliminating invasive plant and animal species with benefits associated with cost, efficiency, effectiveness, and ecological effects. Such is provided with the apparatus and method of use of present invention.

The apparatus of the present invention may include a plurality of ultrasound transducers, which cooperate to emit a pattern of ultrasound waves aimed at a target area containing a number of target organisms. The pattern is created by a cooperative or additive effect of the ultrasound beams emitted from each of the transducers. Though the ultrasonic pattern emitted from the aquatic apparatus may have a drastic treatment effect upon the target population in the target area, as the ultrasonic waves propagate the water, its intensity attenuates, and thus, the distance out of the focal length of the waves may be much less affected by the ultrasound. Therefore, the ultrasonic waves emitted from the aquatic apparatus of the present invention have limited range and limited environmental impact while maximizing maneuverability, robust design, and effectiveness of treatment delivery.

Also, the ultrasonic pattern emission exerts limited environmental impact on the surrounding area compared to other means of control. Ultrasound equipment with no moving parts typically has a long life expectancy of approximately over 30 years, thus the robust equipment is easy to upkeep and may be used for decades. Further, the various embodiments of the apparatus may be used to treat up to and over an acre of area per day. For example, the underwater aquatic device does not require that foreign substances, including chemicals, toxic bait, or piscicides be added to the water, the apparatus may be operated year-round, even with partially frozen cover over a control volume (treatment can start prior to a large development of biomass), retrieval and collection of the treated target or biomass is unnecessary; and equipment is robust with a long life expectancy.

Ultrasound is a sound wave whose frequency is above the audible frequency range for humans; i.e., frequency over 20,000 Hz. The relevant physical principles of ultrasound include resonance phenomena and acoustic intensity. A mechanical system such as a gas bubble may have preferred resonance frequencies. Preferred resonance frequencies are determined by the bubble's dimensions and also by the physical properties of the gas trapped in the bubble. When the frequency of an ultrasound matches one of the resonance frequencies, the displacement amplitude reaches a maximum value. Therefore, the displacement amplitude may become great enough to cause the bubble to rupture.

An ultrasound wave, as it passes through a water medium, may cause bubble activities known as acoustic cavitation. Cavitation causes a wide variety of changes in living cells, ranging from microstreaming of a cell's internal structure, to a mass disruption of cell walls. Acoustic cavitation, one of the dominant mechanisms disclosed herein, is especially evident on aquatic plants due to the presence of gas in the interconnected chambers inside plant petioles, stems, and leaves. As aquatic animals and plants have gas bubbles/pockets within their organs and structures, respectively, they become subject to acoustic cavitation when they may be targeted by an ultrasound wave. The present invention includes an apparatus, a system, and a method for ultrasound treatment in order to control and/or eliminate aquatic plants and animals.

With reference to the Figures, an aspect of the present invention includes an apparatus 100 for in situ control of underwater organisms. Referring to FIG. 1, the apparatus 100 may include a function generator 10, for generating an electronic signal; a power amplifier 20, electrically coupled to the function generator 10, for receiving the electronic signal and amplifying the signal; a plurality of transducers 31, electrically coupled to the power amplifier 20, for converting the amplified electronic signal to a plurality of ultrasonic waves; and an immersible support 50, wherein the plurality of transducers 31 are operatively coupled to the immersible support 50, wherein each transducer 30 generates at least one of the ultrasound waves to provide a pattern of ultrasound waves 45 larger than an individual ultrasound wave to thereby cover a larger in situ target area 70 than an individual ultrasound wave.

Figure 9:
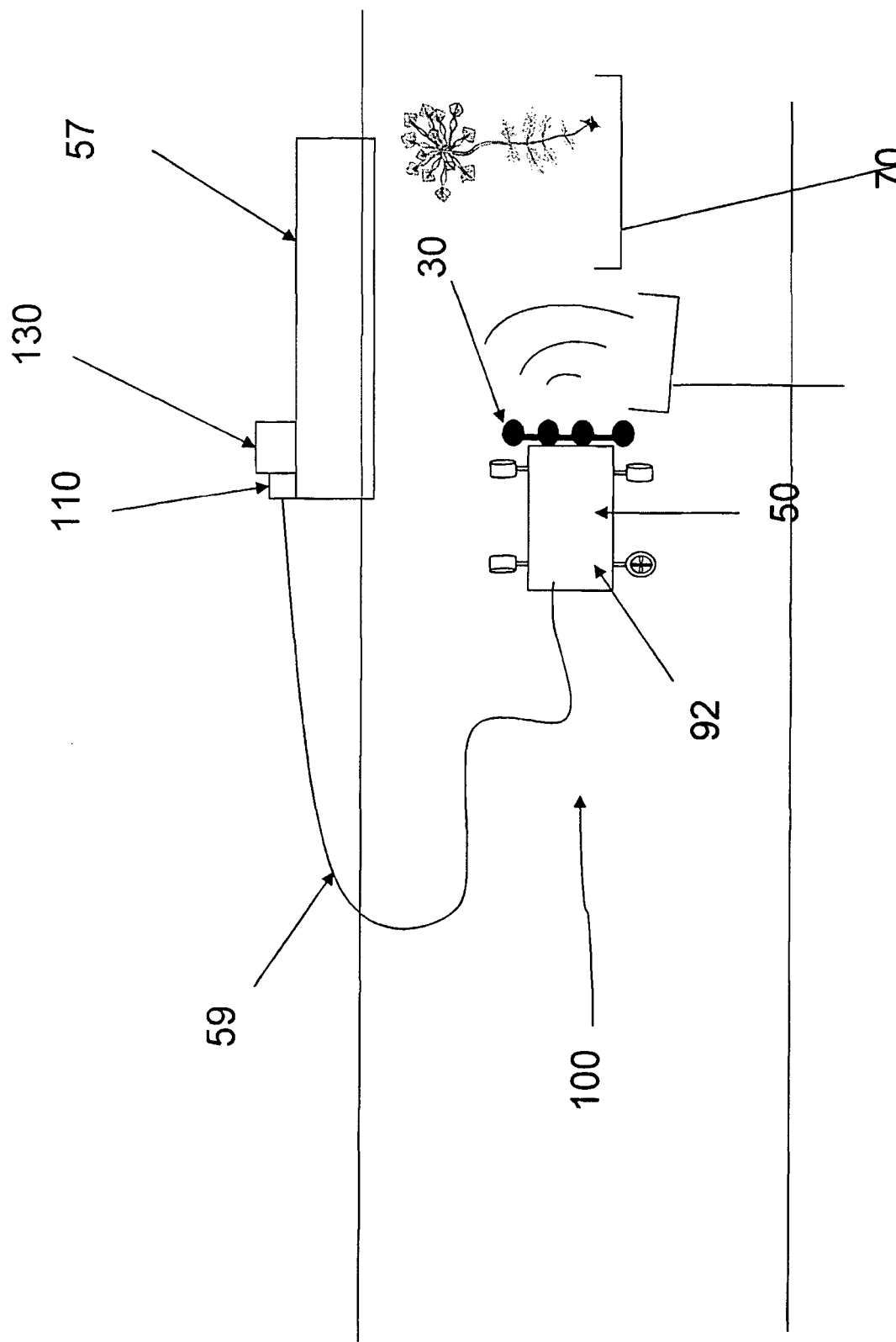
FIG. 9 is a diagram of the apparatus of the present invention in operation, where the apparatus is in electrical communication with a computer and power source housed on a vehicle.
Figure 10:
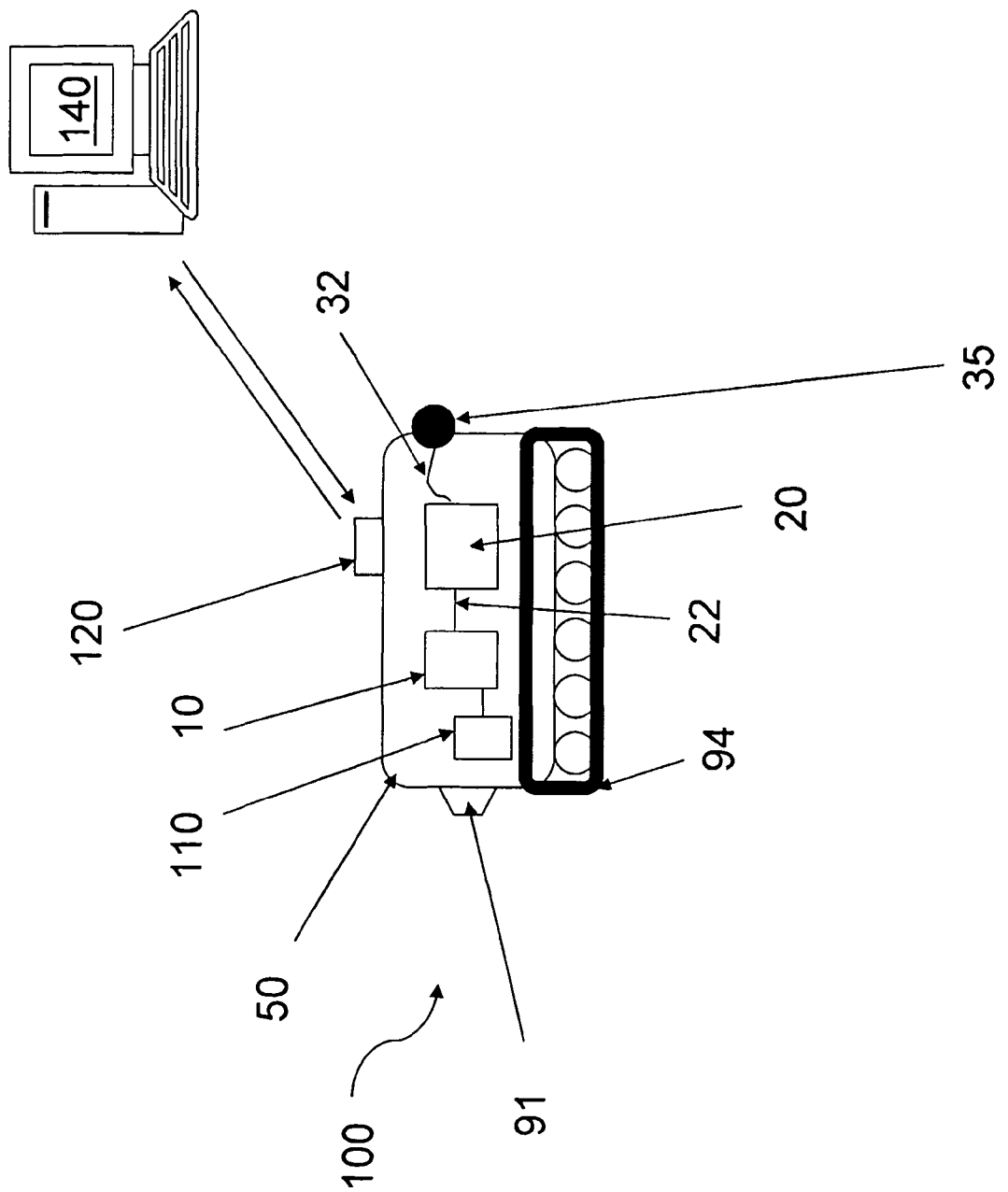
FIG. 10 is an illustration of the apparatus with an onboard transceiver in communication with a remote processor.

Optionally, the function generator 10 and power amplifier 20 may be housed and contained within the immersible support 50 (shown in FIGS. 9 and 10).

Optionally, the apparatus 100 may include a power source 110, as shown in FIG. 1. The power source 110 may be may provide the requisite power to the function generator 10, the power amplifier 20, and other components.

The function generator 10 may be any signal generator and may include, for example, a device for generating the electronic signal of any wave form. The power amplifier 20 may be electrically coupled 22 to the function generator 10 (FIG. 10), and may receive the electronic signal and amplify the signal to an amplified electronic signal. Optionally, the function generator and power amplifier may be combined into an electronic device unit for use in the apparatus. The power amplifier 20 may be any device that amplifies a small amount of electronic energy (e.g. power) to a larger amount of energy (e.g. power). The plurality of transducers 31 may be electrically coupled 32 to the power amplifier 20 (FIG. 10) for converting the amplified electronic signal 21 to a plurality of ultrasonic waves 40. The plurality of transducers 31 may be operatively coupled to the immersible support 50. The transducers 31 may be any type of electroacoustic device, for example, non-focusing piezoelectric elements 35 (as shown in FIG. 10), focusing piezoelectric elements, ultrasonic horns, ultrasonic arrays of any forms, or ultrasonic speakers.

Figure 2:
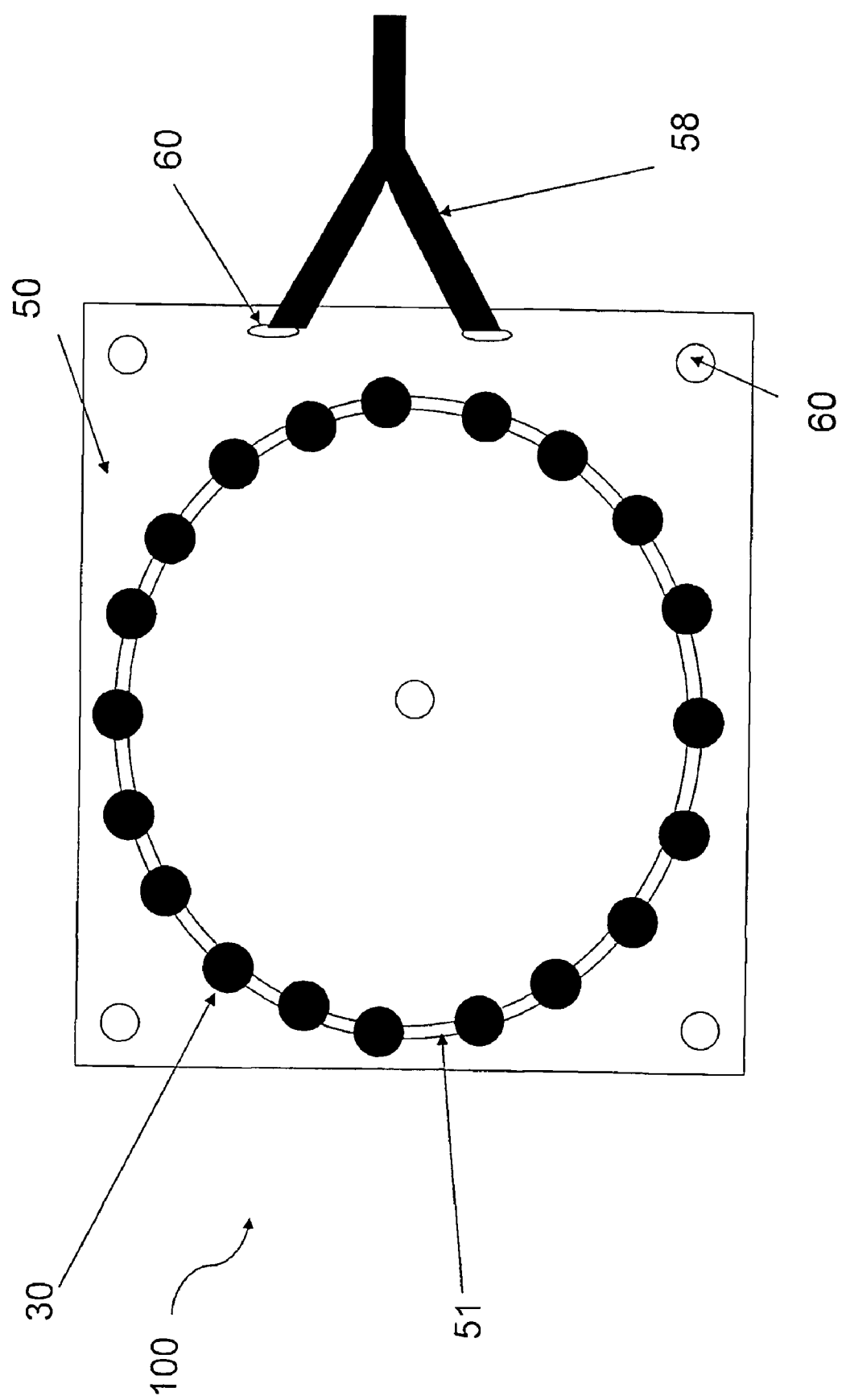
FIG. 2 is a diagram of the top view of an embodiment of the apparatus, being towed by a tow line.

The transducers 31 may be operatively coupled to the immersible support 50, for example, by a removably attached connection 51 (FIG. 2). Each of the transducers 31 may be snapped into place, mounted onto, hooked into place, or even fitted into place on one or more portions of the immersible support 50. Further, the plurality of transducers 31 may be adjusted or modified so that the relative size and shape of the immersible support 50 and relevant transducer orientation may be appropriate for varying environmental conditions and confines. As another example, the transducers 31 may be fixed into place within the immersible support 50.

The immersible support 50 may vary in size and shape and plurality of transducers 31 in the array so as to be ideal and practical for various applications. By varying the array, so too may one vary the focal length, intensity, and/or additive ultrasonic pattern emitted by the transducers. That is, the transducers 31 may be operatively coupled in a variety of ways to the immersible support 50, wherein each transducer 30 of the plurality of transducers 31 may generate at least one ultrasound wave to provide a pattern of ultrasound waves 45 larger than the at least one ultrasound wave. As such, the pattern of ultrasound waves 45 may thereby cover a larger in situ target area 70 and may have an additive affect upon the target, creating a greater intensity than the individual ultrasound wave.

The transducers each emit an ultrasound wave. Each ultrasound wave has a frequency (measured in KHz), an acoustic intensity (measured in $W/cm^2$) sound pressure (measured in MPa), and duration of emission/treatment time (measured in seconds). Also, depending on the size of the transducer, the beam dimension may vary (larger beam dimension with larger transducer). For example, an ultrasound wave emitted by a transducer may have a frequency of 20 KHz, an acoustic pressure amplitude of 1.4 MPa, and a duration of 10 seconds.

The plurality of transducers together emit a plurality of ultrasound waves, which act in concert and have an additive effect as they propagate through a medium to reach a target area or organism. The pattern of ultrasound waves 45 may reach a sizable in situ target area 70, have a greater intensity, and/or a greater focal region or multiple small focal regions as compared to an individual ultrasound wave.

Moving the transducers may in turn modify or adjust the pattern of ultrasound waves emitted there from. Pattern modification may be accomplished, for example, by changing the orientation of each transducer 30 in respect to one another or by changing the orientation of the plurality of transducers 31 to a target plane or target area, as defined below. By dynamically adjusting the electronic signals, an ultrasound beam may be steered or patterned to different locations in the array, for example, to a sub-target location due to extent of infestation.

As used herein, the target plane or target area may refer to an in situ target area 70. This in situ target area may refer to the apparatus 100 targeting one or more phenomena where the phenomena occurs, or within its environment. As an example, various living organisms may be targeted by the present invention at their aquatic in situ location. For example, this target area may directed to the floor of a water body (penetrating at least a partial distance into the sediment of the floor to reach targeted organisms), the water's surface (to reach, for example, submergent aquatic plants and/or algae), a cubic volume of water or liquid within an area, or even a superficial control volume of water (as an anti-fungal treatment for cosmetics, or as comestible purification), such as, for example, that of a swimming pool or a ballast tank in an boat or ocean vessel (to treat for microbes, bacteria, and/or insects). Alternatively, as will be disclosed herein, the in situ target area may refer to the living organism targeted by the apparatus, method, and system within its in situ location.

The in situ target area 70 may include at least one living organism selected from the groups including, for example, aquatic plants, alga, crustacean, mussel, fish, amphibians, animals, insects, plankton, bacteria, microbes, single-celled organism, and the like. Specifically, parameters of the apparatus may be directed to known limitations of the petioles or stems of aquatic plants, air pockets or gases located in the gills and brains of animals, and gases in plankton, algae, and single-celled organisms in order to cause acoustic cavitation which results in cell and tissue damage, ultimately weakening the organism or eliminating the organism altogether. These examples are meant to be non-limiting, and may include various classes of aquatic plants, including free-floating plants, submergent plants, emergent plants, and rooted-floating plants. It should be noted that any organism that may be considered or classified as threatening to the balance of an ecosystem may be in situ target areas for the purposes of the present invention. It is important to note that once the in situ target area is treated, the target or organism is left in its in situ position and location. Thus, the treated organisms in a target area may serve as a source of food for desired organisms. Also, the decomposition of the treated organisms may enrich the soil of the ambient and provide nutrient rich sediment. Each of these post-condition treatments will serve not only to remove the targeted organisms from the environment, but will also return to the nutrients of the organism to the soil at the water's floor, providing desired non-targeted organisms with food, room to expand, and otherwise promote the in growth, development, and support of the desired organisms and species.

Incorporated herein by reference in their entirety are several publications which detail the ultrasonic treatment of aquatic plants, including: Wu, M. and J. Wu., 2007, *Laboratory investigation on effects of ultrasonic control of water chestnut, Journal of Aquatic Plant Management* 45:76-83; Wu, M. and J. Wu, 2007, *Can ultrasound eradicate water chestnuts?* Journal of Ecological Restoration 25(1): 64-65; and Wu, J., and M. Wu, 2006, *Feasibility study of effect of ultrasound on water chestnuts*, Journal of Ultrasound in Medicine and Biology 32(4):595-601.

Figure 6:
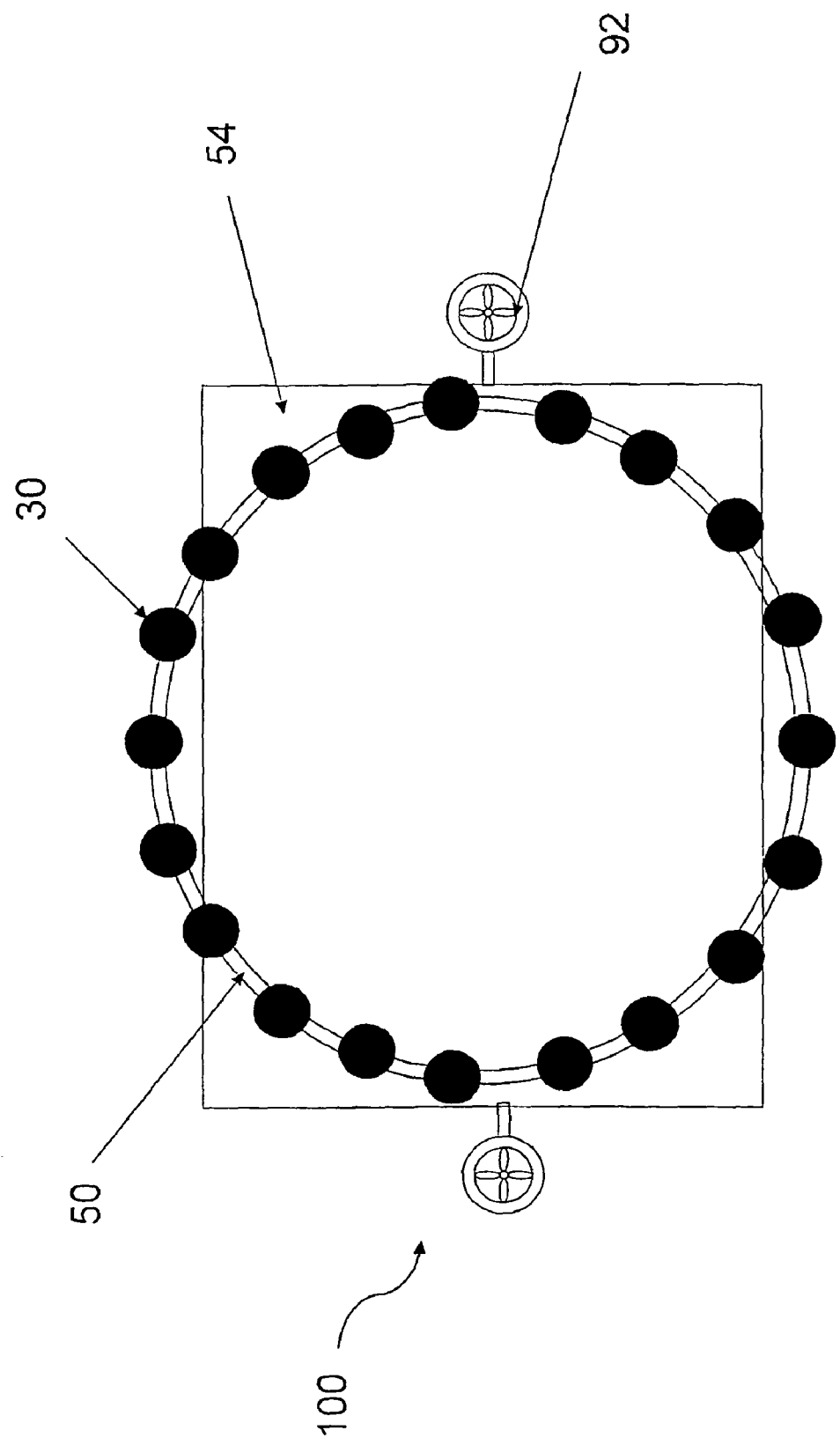
FIG. 6 is a front view of an embodiment of the present invention with transport members on an encasing member, which houses the electrical components of the apparatus.

The immersible support 50 may be a variety of configurations of varying dimensions, and composed of materials, as may be desired. For example, the support may be in a circular configuration, an angled bar, a geometric shape, or along a straight line or bar (FIG. 2 (flat plate); FIG. 6 (generally circular bar); FIGS. 9 and 10 (geometric shapes. As an example, the immersible support 50 may have a diameter of 40 cm with 20 evenly spaced transducers located about 18 degrees from one another. The diameter of the immersible support 50 may be large or small, or of varying sizes and shapes, as may be desired. The immersible support may further include at least one attaching member 52 to attach the removably attach wiring to the support.

Optionally, the immersible support 50 may have a hollow interior to facilitate the wiring feed to communicate the plurality of transducers 31 to the power amplifier 20 and function generator 10.

Figure 7:
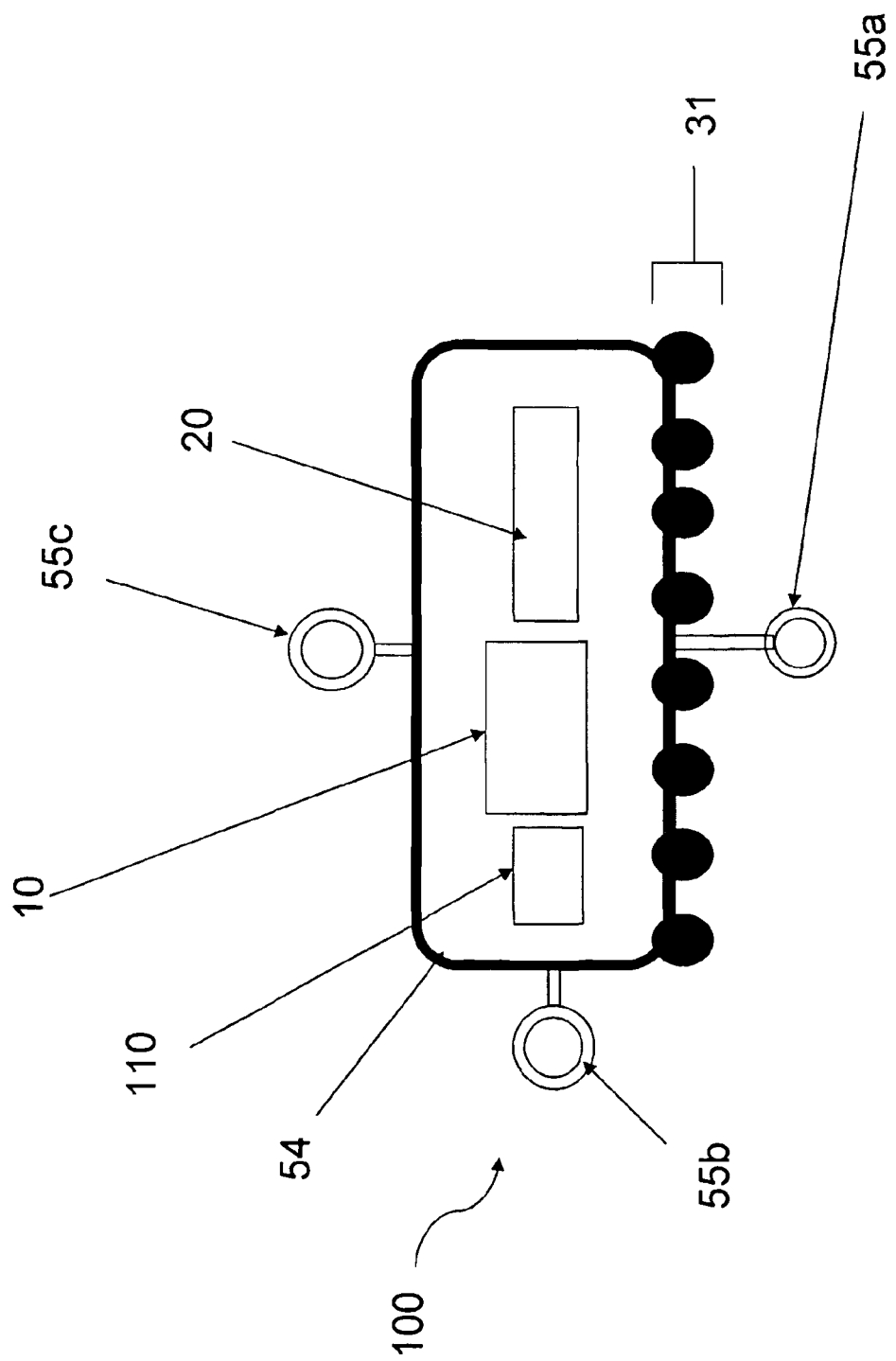
FIG. 7 is a cut away side view of a diagram of the apparatus, showing the electrical components housed in the encasing member with loop connectors associated to the encasing member.

The apparatus may include a transport member 90, as shown in FIGS. 6, 9, 10, 11, and 12. The immersible support 50 may provide attaching areas or contact points for the connectors to attach to the transport member 90 to the apparatus. The immersible support 50 may likewise have a plurality of perforations 60, vias, holes, bores, protrusions, loops (55*a-c*), or inconsistencies as shown in FIG. 2 and FIG. 7 to attach the support to a float, buoy 62, weights, anchor 61, or other type of device to facilitate transport or anchoring, as may be desired (shown, for example, in FIGS. 8A-8C). That is, the immersible support 50 may be configured to reduce deforming drag that may act upon the support and transducers as the apparatus may be used, in order to maintain the configuration of transducers and structural integrity of the apparatus 100. Similarly, the perforations or loops may be used to attach the apparatus 100 to a tow line or tie 58 to attach to a boat 57 for transport, as may be shown in FIG. 2 and FIG. 5. As a result, the emitted pattern of ultrasound waves 45 may be constant, calibrated, and measurable.

Figure 3:
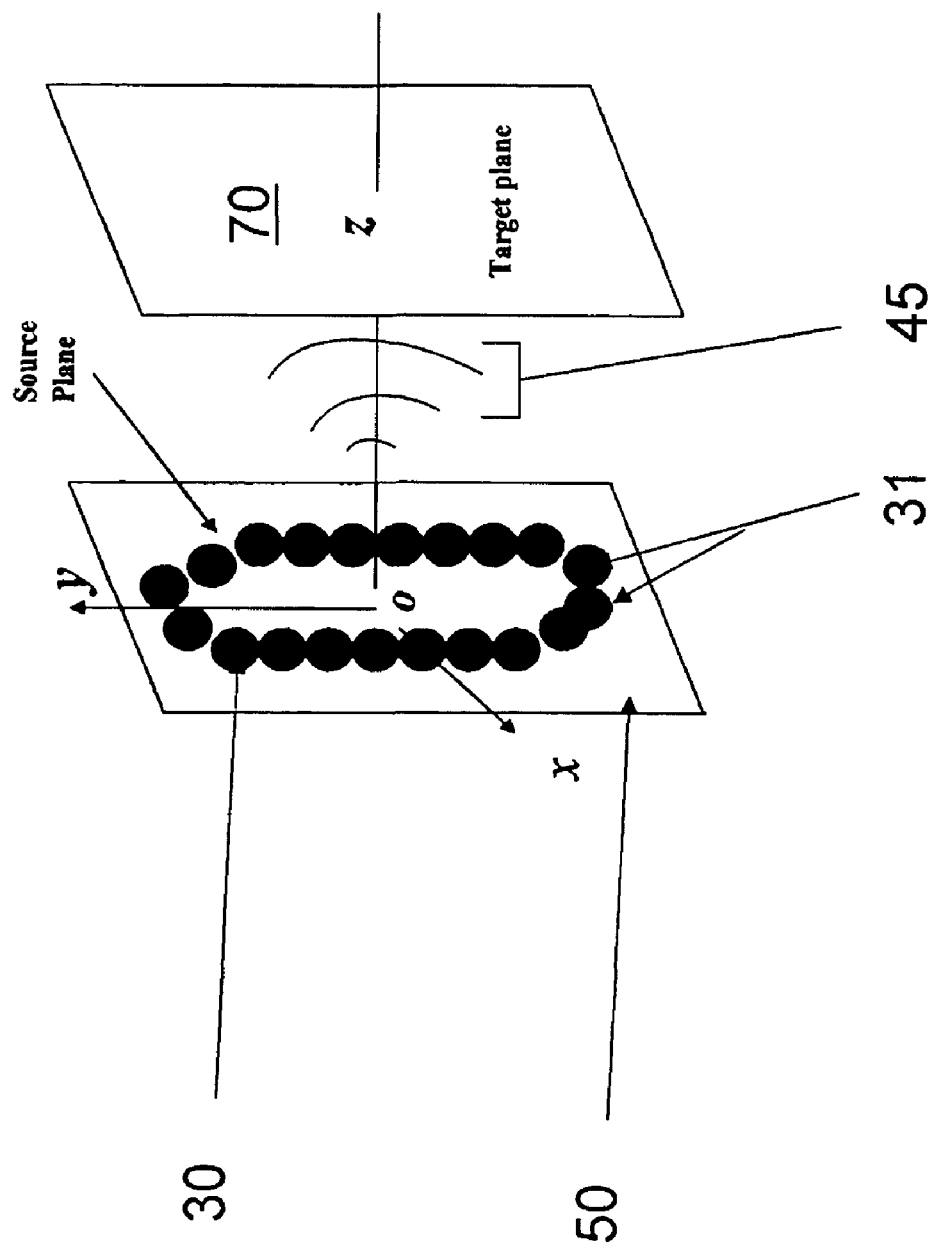
FIG. 3 is diagram of the ultrasound emitted from the source plane of the (as in FIG. 2) to a target plane (in situ target area).

FIG. 3 is a depiction of the x,y,z axis of an embodiment of the present invention by using, for example, a central location of the apparatus 100 as the origin, labeled O. FIG. 3 is a diagram of the apparatus 100 in operation on the in situ target area 70. When the plurality of transducers 31 emits the pattern of ultrasound waves 45, the waves travel together and hit the in situ target area in varying patterns. The pattern depends, as previously disclosed, on the number, location, and configuration of transducers 31. For example, the orientation of the transducers from one another and the displacement of the plurality of the transducers 31 from the in situ target area 70 may cause different patterning effects.

Figures 4A, 4B, 4C:
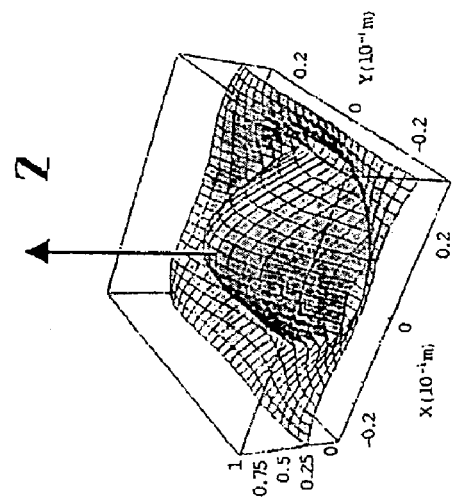
FIG. 4A is a computer model of an ultrasound wave pattern emitted by the apparatus at an exemplary distance from the target plane.
FIG. 4B is a computer model of an ultrasound wave pattern emitted by the apparatus at another exemplary distance from the target plane.
FIG. 4C is a computer model of an ultrasound wave pattern emitted by the apparatus at still another exemplary distance from the target plane.

Computer models of the various ultrasound patterns are depicted in FIG. 4A through 4C. FIG. 4A, FIG. 4B, and FIG. 4C, as referenced herein, depict a set of computer simulation results of the normalized acoustic pressure distributions at three different target planes. That is, the pattern of ultrasound waves 45 of a given orientation may differ for a various distances of the in situ target area. These variations may be characterized by the varying acoustic pressure patterns, as simulated herein. The values of z in FIG. 4A, FIG. 4B, and FIG. 4C represent the distance between the apparatus 100 and the in situ target area 70 plane. The various computer simulated ultrasound wave pattern 45 may be distinct for different in situ target area 70 plane distances as measured from the origin of the apparatus 100. FIG. 4A represents a displacement from the apparatus 100 to the in situ target area 70 (in the z axis) of 0.5 meters. FIG. 4B represents a displacement from the apparatus 100 to the in situ target area 70 (in the z axis) of 1.0 meter. FIG. 4C represents a displacement from the apparatus 100 to the in situ target area 70 (in the z axis) of 1.5 meter. As depicted in FIGS. 4A, 4B, and 4C, the computer simulations each depict acoustic pressure patterns that are easily distinguished from one another, as each differs from the next in the relative shape (or pattern) of acoustic pressure. These varying acoustic pressure patterns may be likewise characteristic of a different ultrasound wave pattern 45 of emission from the apparatus 100 at different displacements from the in situ target area 70 plane.

Figure 5:
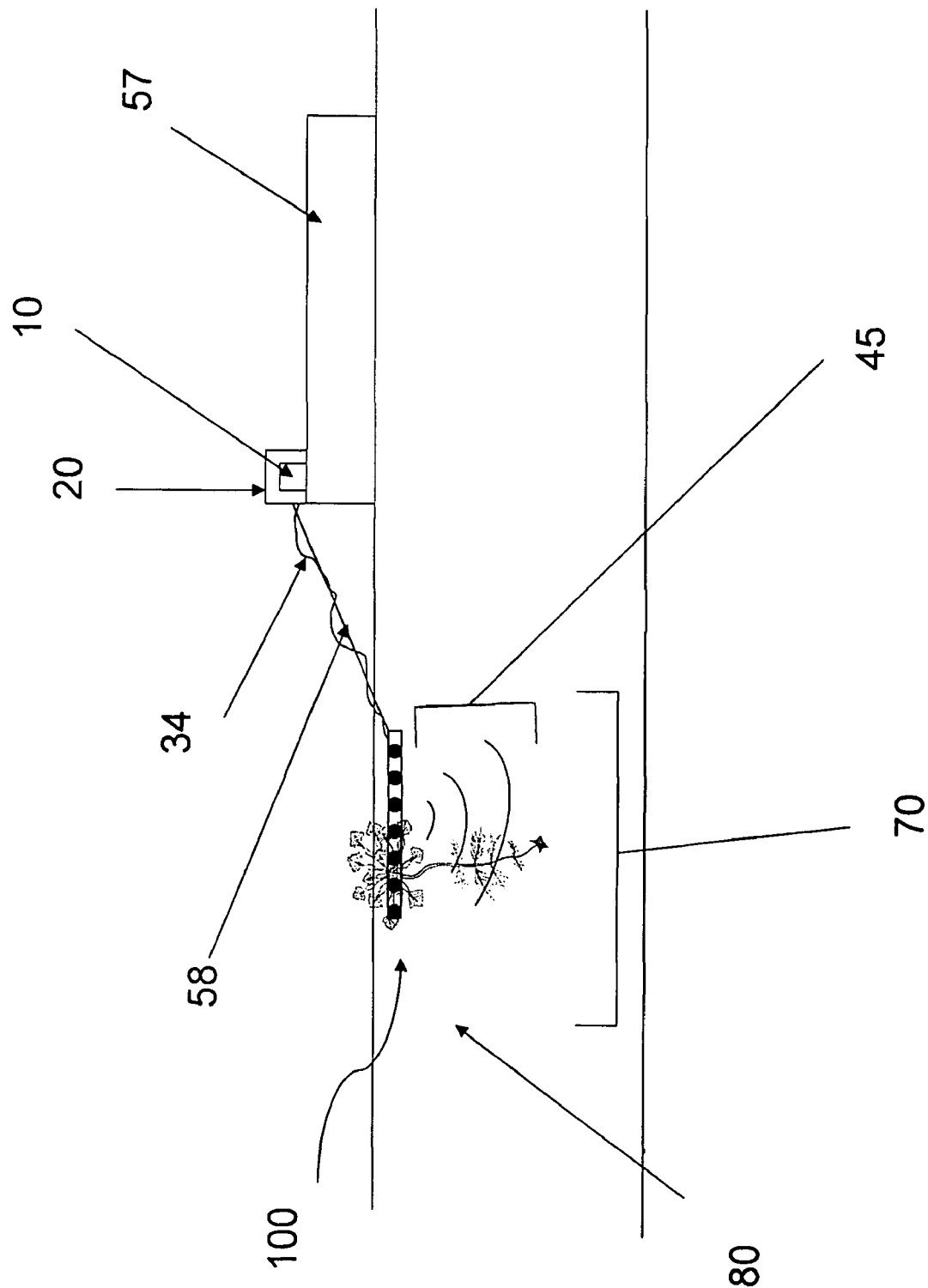
FIG. 5 is a diagram of the apparatus in operation, being towed through the water by a vehicle.

In FIG. 5, the in situ target area 70 plane may be parallel or otherwise generally along to the water surface, emitting ultrasound waves either towards or away from the surface. When used with a boat or other vehicle, the apparatus may be attached to the vehicle at one or more contact points 60. The contact point 60 may be one or more of the forms previously discussed, as utilized by the transport connector 58 to associate the apparatus 100 with the transport member 57.

In use, the apparatus 100 may be configured to emit the pattern of ultrasound waves in any one of a number of desired angles or orientations towards the target area 70.

Optionally, as shown in FIG. 7, the apparatus may include an encasing member 54. The encasing member 54 may be configured to encase the function generator 10, the power amplifier 20, the power source 110, and/or at least a portion of the transducers 31. The encasing member 54 may secure and protect the electronic components from damage upon immersion.

In this orientation, the apparatus may be left for a period of time to emit ultrasound waves on an in situ target area 70 which may be more concentrated or more highly populated with one or more targeted organisms. In such a configuration, it may be necessary for either buoyancy or weight to be added to the apparatus 100 to facilitate the encasing member 54 to either have a tendency to float or sink.

FIG. 7 shows three potential locations of a connection loop 55, at 55a, 55b, and 55c. The connection loops 55a, 55b, and 55c may swivel or otherwise freely rotate. The connections loop 55 may be used to attach the apparatus to a buoy, anchor, or combination thereof. It may be desirable to treat a location (thus anchor the apparatus) or to treat an area by dropping off the apparatus upstream and retrieving it after it has floated downstream (buoy). FIG. 8A through 8C depicts a buoy, anchor with line, and anchor with rigid bar, respectively.

For example, the connection loop 55 may be oriented with the transducers 31 towards the surface, water bed, shore lines, upstream or downstream, as may be desired.

Referring now to FIG. 9-12, the apparatus 100 may optionally include a transport member 90. The transport member 90 may be operatively coupled to the immersible support 50 for mobility. The transport member 90 may be selected from the group consisting of: a jet 91, a propeller 92, a wheel, a track 94, a robotic arm, a fin, a paddle, and combinations thereof. For example, the posable propellers may be moved in varying degrees in order to move the apparatus 100 to a location. The jet may be a result of, for example, a release of pressurized air or a forced output of water. A wheeled (or tracked) system may be used in aquatic operation, for example, in amphibians or very shallow applications. The tracked and wheeled apparatuses may be used for fully submerged operation on a water body floor or bed.

FIG. 10 illustrates the apparatus 100 of FIG. 9, as it may be supplied with power by a power source 110. Alternatively, the power source 110 need not be supplied from a transport member 58 (as shown in FIG. 10), but may be, for example, an on-board battery, engine, or a solar energy pack. Such a power source 110 which may provide power to the apparatus 100 so that it may be independently operable and mobile.

Figure 11:
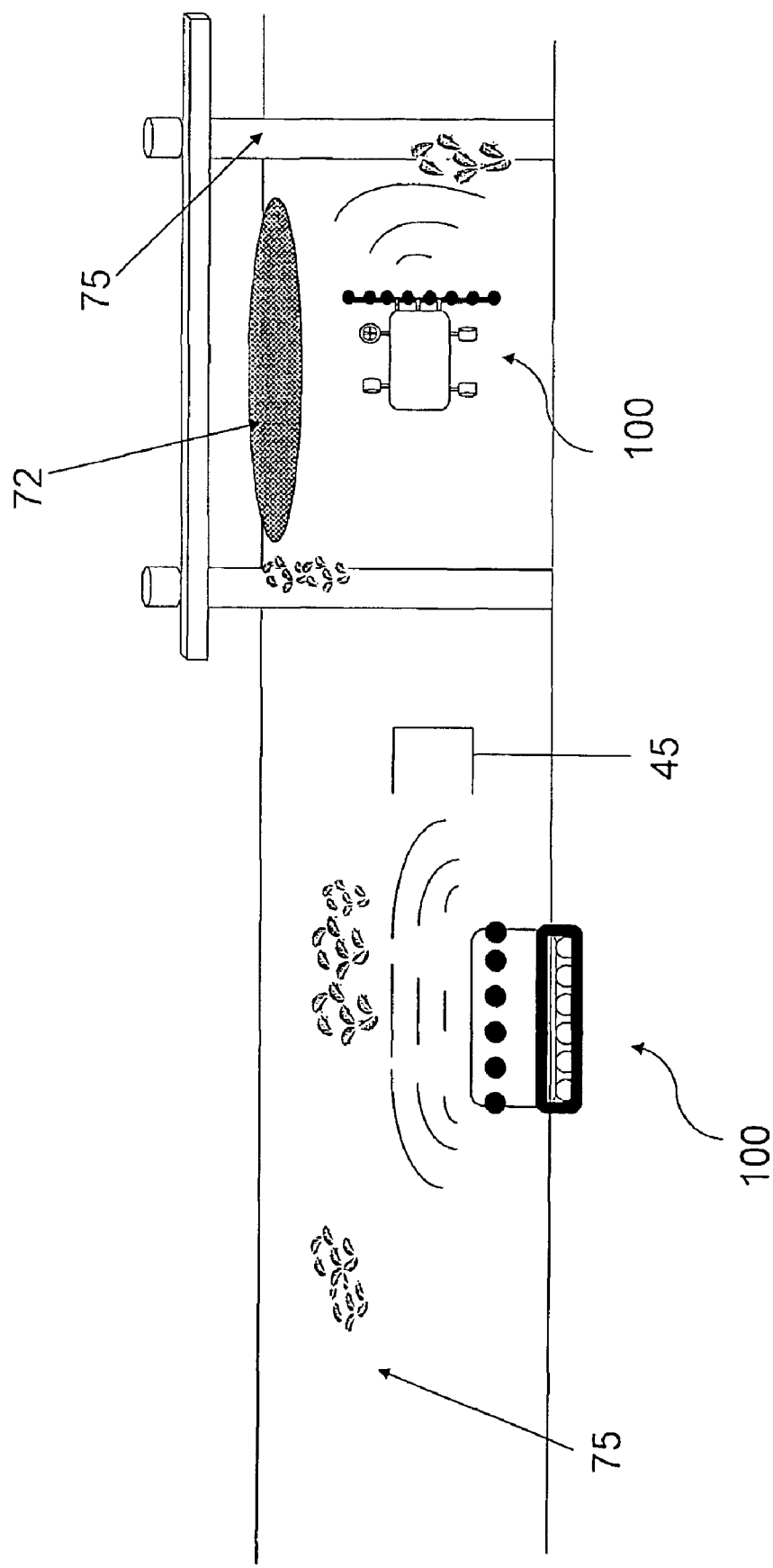
FIG. 11 is an illustration of two embodiments of the apparatus of the present invention in operation, one with a track transport member and the other with posable propellers.
Figure 12:
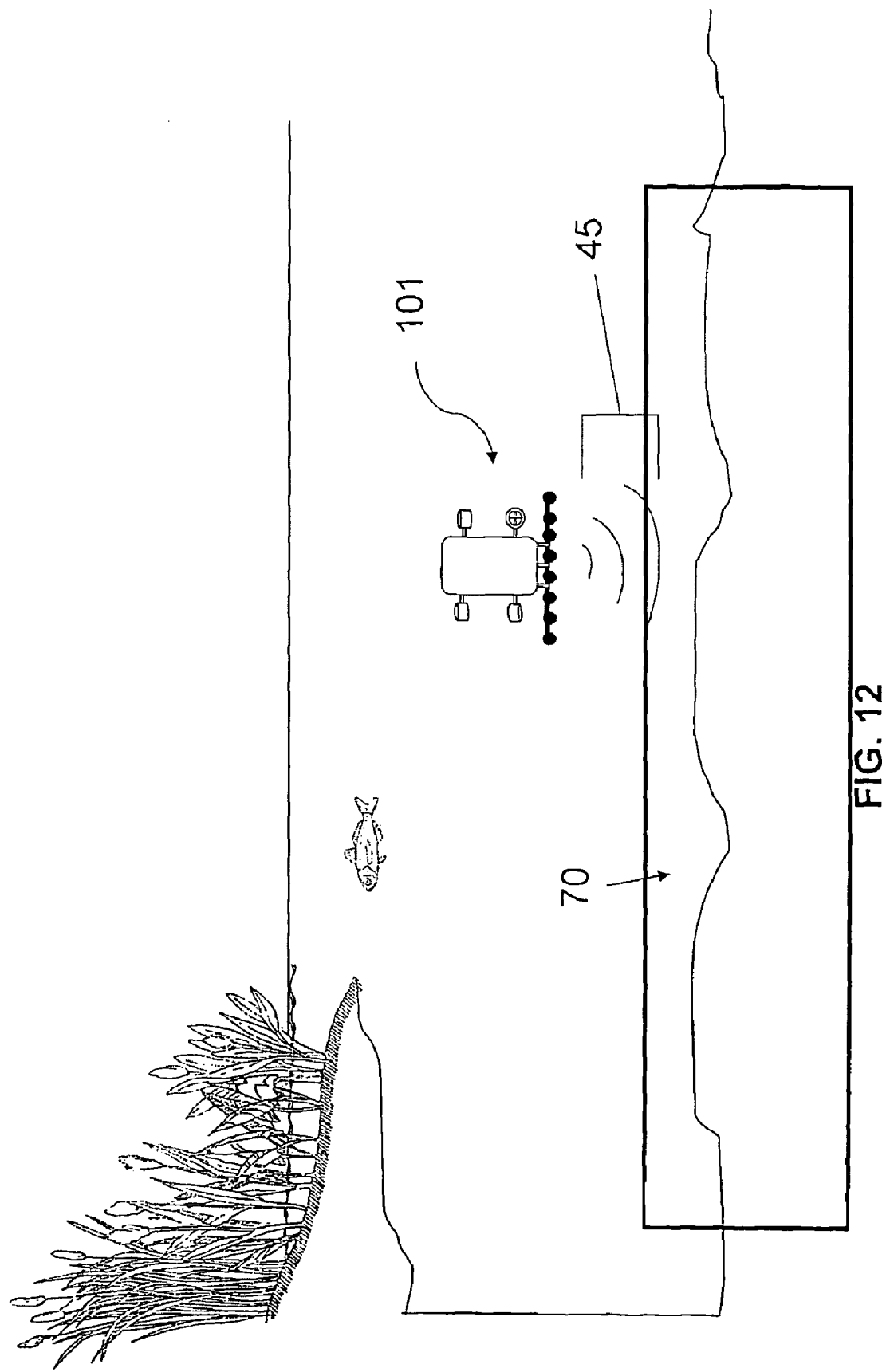
FIG. 12 is an embodiment of the apparatus of the present invention including posable propeller transport members in operation to permeate in situ targets located a least partially beneath the sediment of a water floor.

Optionally, the apparatus 100 may be a remote operated vehicle (ROV) as shown in FIG. 9. The apparatus 100 may further include an umbilical cord 59. The cord 59 may house video feed lines, electrical cables, and the like as may be desired. The central computer 130 and power source may be located on a boat or other vehicle which may store the ROV between uses and tow the ROV during operation. Referring to FIG. 11, specific targets including algae 72 and mussels 75 may be targeted by the two embodiments of the apparatus 100 shown.

Figure 14:
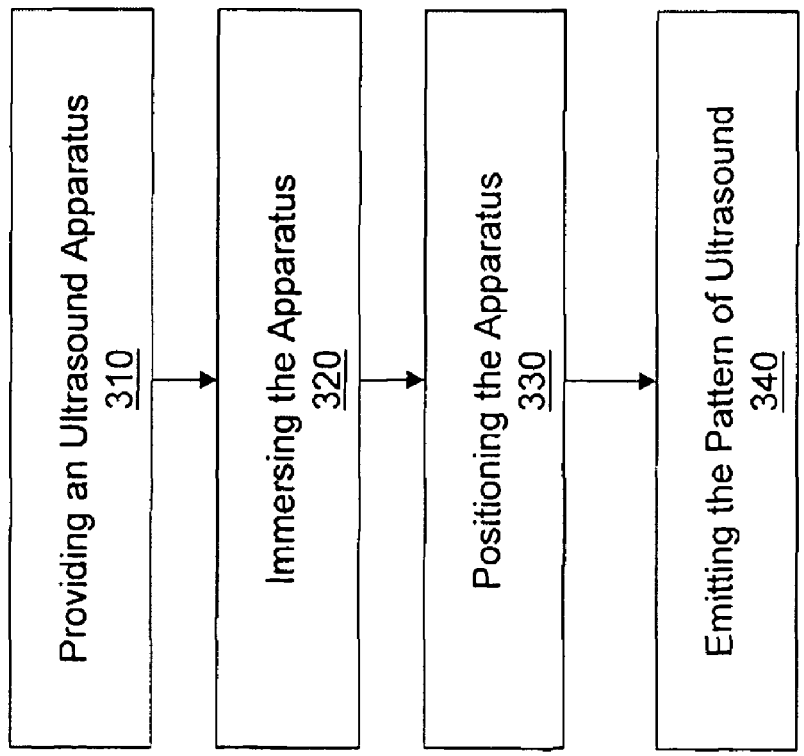
FIG. 14 is a diagram of the method of the present invention.

Optionally, the apparatus 100 may further include a transceiver 120 (FIG. 10, 13). This transceiver 120 may be configured to communicate with a remote processor 140. In FIG. 14, an apparatus 100 may be shown in wireless communication with a remote processor 140. The transceiver 120 may send aquatic apparatus data to the remote processor 130. Such aquatic apparatus data may include ultrasound wave pattern emission data, location data, observation data, etc. Alternatively, the transceiver 120 may receive instructions from the remote processor 140. Such instructions may include changes in ultrasound wave pattern variables, change in position, etc.

The power source 110 may include a solar cell or a fuel cell, either of which may be located in a position adjacent to the immersible support 50, but in communication with the aqueous environment.

The pattern of ultrasound waves 45 may be emitted through a volume of water, through water onto a hard submerged surface such as a boat or a dock, towards the water's surface, or into the water body floor 5, where an in situ target population may originate (e.g. germinate or hatch) and grow prior to adulthood.

Figure 13:
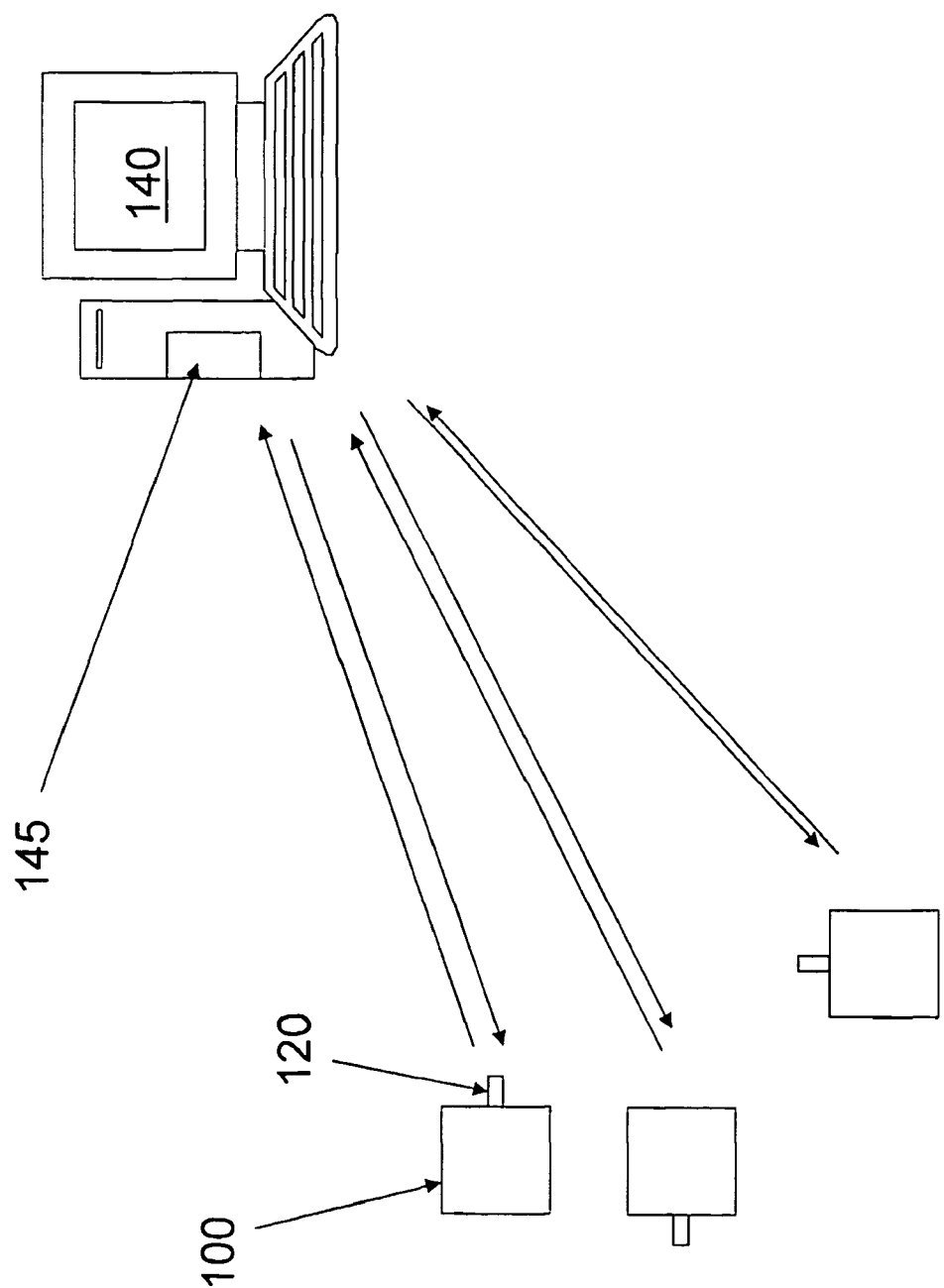
FIG. 13 is a diagram of a plurality of apparatuses, each with a transceiver, in communication with a processor having a transceiver.

It is within the scope of the invention to utilize a plurality of apparatus 100 in an area with a central computer in order to use a system to manage and control in situ aquatic organisms (as shown in FIG. 13). Each apparatus 100 may have a transceiver 120 capable of communicating to a remote computer 140, where the apparatus is configured to receive operating instructions and parameters from the computer 140.

For example, the present invention may include an environmental treatment system which includes a plurality of mobile ultrasound apparatuses 100, with a transceiver 120 coupled to one of each apparatus 100. A remote processor 140 may be configured with a transceiver to communicate with, guide, transmit, and receive and interpret data from the transceiver 120 of each apparatus 100. The remote processor 140 may track population, population density, organisms treated, organisms eliminated, GPS data of target location, size, and apparatus locations. Further, the remote processor 140 may send instructions to reposition, refine the ultrasound wave patterns, or change the duration of emission of ultrasound from the transducers.

The remote processor 140 may include a remote processor to process and manipulate data collected by each apparatus 100. The data may be the result of an aquatic survey, a global positioning system image, a map detailing a latitude and longitude, et cetera. Further, the remote processor may include a data of a projected population density of the at least one living organism target population. The remote computer transceiver and the transceiver of each apparatus may communicate information, data, and instructions back and forth though wireless signals that may be received and transmitted by each of the respective transceivers.

Another aspect of the present invention provides a method 300 of treating a target area with an ultrasound wave pattern, as depicted in FIG. 14. The method 300 includes: providing an ultrasound apparatus 310 having an ultrasound wave generator operatively attached to a plurality of transducers, each of the transducers configured to emit an ultrasound wave, the plurality of transducers coupled to an immersible support; immersing the apparatus into a water environment 320; positioning the apparatus proximate to a target area to treat at least one in situ organism 330; and emitting a pattern of ultrasound waves from the transducers, the pattern of ultrasound waves additive in effect and emitted onto the target area to threat an in situ underwater organism with an ultrasound wave pattern 340. The ultrasound wave generator may include, for example, a signal generator, a power amplifier, a function generator, and a power source, electrically connected to one another as previously disclosed.

The step of immersing the apparatus may include maneuvering the ultrasound apparatus 320 with a transport member to a position beneath the water surface, the transport member attached to the immersible support. The step of positioning the apparatus 330 may include moving the apparatus to a predetermined distance from the target, where the predetermined distance is within the range of the pattern of ultrasound waves emitted by the transducers. The step of emitting the pattern of ultrasound 340 waves may further include emitting an acoustic pressure for a predetermined period of time onto a surface of at least one organism.

The method may further include the step of damaging the in situ targets by acoustic cavitation. Also, the method may include the step of transmitting information to a central processor for collection and processing. Further, the method may be repeated on an organism, population of organisms, on the target, or in an environment until a desired effect is reached. The desired effect may be elimination of a certain percentage of a population, eliminating a population, and the like, until a desired level of treatment has been administered.

Next, the method 300 includes positioning the apparatus proximate to an in situ target area of aquatic organisms 340. The in situ target may be selected from the group of living organisms, as previously discussed. The method step of positioning the apparatus 340 may further include maneuvering and aiming transducers of the apparatus with a transport member to a predetermined distance from the target 341.

Finally, the method 300 includes emitting the pattern of ultrasound waves onto a surface of the plurality of in situ aquatic organisms located in an in situ target area 340. Emitting a pattern of ultrasound waves includes emitting a frequency and an acoustic pressure for a predetermined duration. The apparatus may be moving through the water while emitting the ultrasonic pattern of waves towards the in situ target area. Also, by moving the ultrasound wave generator and piezoelectric element through the water, the method of ultrasound treatment 300 may generating a larger treatment area than a stationary apparatus 100 to thereby cover a larger in situ area than an individual ultrasound wave 353. Through the at least one emission, the method 300 may also include the step of damaging the in situ targets by acoustic cavitation 370 (not shown).

The various positions and emissions may be recorded as the method may include transmitting at least one method data to a central processor, and collecting the at least one data to the central processor 360.

It should be noted that the method 300 of ultrasound treatment may be reiterated or repeating 350 as many times as needed within a given treatment. Therefore, the method 300 may further include the step of reiterating 350 the steps of 330 positioning the apparatus and 340 emitting the pattern of ultrasound waves onto a surface of the plurality of in situ aquatic organisms.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention.

EXAMPLES & EXPERIMENTAL DATA

Introduction to Experimental

A study was conducted to investigate the potential of the ultrasonic control of water chestnut in efforts to effectively damage plant cells and tissues to prevent population expansion and growth. The Water chestnut (*Trapa nalans* L.) is an annual aquatic macrophyte with floating leaves around a central stem and feathery, adventitious submersed structures which effectuate nutrient absorption and act as submerged anchors for the plant. Water chestnut leaf petioles are filled with gas chambers. The spongy inflated leaf petioles provide buoyancy, allow the circulation of gases, and enable the leaves to float and perform photosynthesis. The species can grow in water up to 5 m deep but usually prefers shallow waters up to 2 m deep with muddy bottoms. The seeds start germination when the water temperature is above 8 degrees C., with an estimated germination rate of 87%.

Various frequencies and amplitudes of ultrasound waves generated by submerged transducers were applied directly to water chestnuts. Ultrasound frequencies of 20-kHz, 100-kHz, 500-kHz, 1-MHz, and 2-MHz caused substantial damage to plant cells and penetrated petiole tissues. 20-kHz ultrasound caused the most significant cell damage after 10 seconds of ultrasound exposure. The mortality rate of water chestnut plants treated with ultrasound aimed directly at water chestnut stems was 97% with no seed production. The results of this laboratory study demonstrated that ultrasound caused severe damage and plant death by aiming 20-kHz ultrasound waves directly on water chestnut stems.

Dense surface mats intercept up to 95% of incident sunlight and suppress native submerged and floating plants as well as their associated microscopic flora and fauna, successfully colonizing and ultimately monopolizing aquatic habitats. Water chestnut plants provide low value food for wildlife, as compared to the native species it replaces. Under dense water chestnut beds, dissolved oxygen was observed to be lower, which impacts fish and invertebrate communities. Water chestnut infestation also restricts recreational water uses and navigation. In some instances, water chestnut completely chokes a waterway and makes boating impossible.

Ultrasound is a sound wave, the frequency of which is above the audible frequency range for humans; i.e., frequency greater than 20,000 Hz. The relevant physical principles of ultrasound include resonance phenomena and acoustic intensity. Mechanisms of bioeffects of ultrasound include "thermal" and "mechanical" effects (National Council on Radiation Protection and Measurements 2002). When ultrasound waves are absorbed by plants, energy associated with ultrasound waves is converted into heat, or a thermal effect. An ultrasound wave, as it passes through a water medium, can cause bubble activities known as acoustic cavitation, as a mechanical effect.

Cavitation causes a wide variety of changes in plant cells, ranging from microstreaming of a cell's internal structure, to a mass disruption of cell. Acoustic cavitation, the dominant mechanism in ultrasound application, is especially evident on aquatic plants due to the presence of gas in the interconnected chambers inside plant petioles. In general, the smaller the radius of the gas size, the greater the acoustic cavitation.

Documented effects of ultrasound on plant cells include chromosomal anomalies, cell death, damage to or destruction of cellular structures, reduced growth rates and mitotic indices, changes in osmotic potential of cells, and chemical changes within the liquid being cavitated.

The objective of this study was to determine the feasibility of ultrasonic control for water chestnut. A preliminary study was first conducted to determine the optimal ultrasound wave to successfully eradicate water chestnut plants. Ultrasound waves of various frequencies and amplitudes generated by submerged transducers were applied directly to water chestnut plants to determine the optimal ultrasound waves for water chestnut management. A subsequent study was conducted to assess the effectiveness of ultrasonic control of water chestnuts using selected ultrasound waves under a controlled greenhouse environment.

Materials and Methods: Plant Materials

Harvested water chestnut plants were washed completely clean of sediment, plankton and invertebrates and then placed in a 2800-liter tank (1 m wide, 1.21 m deep, and 2.4 m long) constructed with stainless steel frames and polyvinyl chloride liners. The tank was filled with Hoagland's solution containing 20 mg/L nitrogen as ammonium nitrate ($NH_4NO_3$), 5 mg/L phosphorus as monobasic sodium phosphate ($naH_2PO_4.H_2O$), 20 mg/L potassium as potassium sulfate ($K_2SO_4$), 20 mg/L calcium as calcium chloride ($CaCl_2.2H_2O$), 20 mg/L magnesium as magnesium sulfate ($MgSO_4.7H_2O$), and traces of manganese, boron, zinc, copper, and iron. The plants were kept in Hoagland's solution for at least two weeks before they were used in the experiments. Temperature in the greenhouse ranged between 25 and 30 degrees C. during the study period. Dead leaves were removed by hand, simulating the natural removal of dead leaves by waves under field conditions.

Ultrasound Selection Study

A laboratory study was first performed to determine the optimal frequency, acoustic pressure amplitude, and minimum ultrasound exposure duration required to successfully damage water chestnuts. A computer-controlled measurement system (NTR Systems, Seattle, Wash., USA), including three linear position manipulators and a digital oscilloscope as a digitizer (Model 9310, LeCroy Inc., Chestnut, N.Y., USA), was used to measure a two-dimensional cross-axis sound field. A calibrated pvdf membrane hydrophone with a 0.2 mm diameter electrode (Sonic Consulting, Inc. Wyndmoor, Pa., USA) was used as a sound-wave sensor for all mega hertz frequencies. A calibrated 6 mm diameter pvdf hydrophone (Model 8103, Brüel & Kjaer, Naerum, Denmark) and a charge amplifier (Model 2635, Brüel & Kjaer, Naerum, Denmark) were used for 20-kHz and submega hertz sound fields. The three dimensional position of a hydrophone was controlled by a computer via 3 linear manipulators (NTR Systems, Seattle, Wash., USA).

A transducer was electronically connected to HP 3314A function generator (Hewlett Packard, Calif.) and an ENI A-300 RF power amplifier (ENI, Rochester, N.Y., USA). A 20-kHz sound field was generated by a 20-kHz horn driven by a power source/supply from a sonicator (Model 450, Branson Inc., Danbury, Conn., USA). When a non-focusing transducer was used, a hydrophone was scanned at a plane that was perpendicular to the acoustic axis of the sound field with a distance of 1 cm from the surface of the transducer. When a focusing transducer was used, a hydrophone sensing element was scanned at the focal plane of the sound field. The in situ spatial-peak pulse-average intensity, $I_{SPPA}$ (National Council on Radiation Protection and Measurements 1983), was also calculated post-measurements.

After the sound field mapping, a portable single ultrasound transducer of known resonance frequency was then submerged in a 30-gallon tank. A water chestnut leaf and petiole freshly dissected from a healthy plant were mounted on a plastic holder. When a non-focusing transducer was used, the sample/sample holder was positioned at 1 cm from the transducer. Consequently, the petiole was exposed to a nearfield ultrasound field generated by the transducer. When a focusing transducer was used, the plant leaf was placed within the ultrasound's focal region. After the ultrasound exposure, the treated petiole was dissected horizontally. Each dissected cross section (approximately 1 mm thick) of the petiole was then examined under a microscope to examine the impacts of ultrasonic treatment on the water chestnut plant tissue.

Effectiveness of Ultrasound Study

The laboratory-scale effectiveness of ultrasound was conducted using 15 tanks measuring 55 cm in diameter and 68 cm in height under a controlled greenhouse environment. Temperature in the greenhouse ranged between 25 and 30 degrees C. during the study period. Each tank was filled with 90 liter of Hoagland's solution. Six water chestnut plants with an average number of 18.3 leaves per plant were placed into each tank one week before the beginning of the experiment (Table 2). Five tanks of plants were treated with ultrasound aimed directly on petioles for approximately 2 second per petiole; this was designated the petiole treatment.

Another five tanks of plants were treated with ultrasound aimed directly at one target spot on each plant stem for 10 seconds; this was designated the "stem" treatment. No ultrasound treatment was performed on the third group of five tanks; these five were the control group. Ultrasound transducers were submerged in water and aimed directly at target plants from underneath. Plant mortality, number of leaves per plant and seed production were investigated daily as well as water temperature and pH. Once a plant lost all its leaves and buoyancy, a plant was pronounced dead. Dead leaves were removed by hand, simulating the natural removal of dead leaves by waves under field conditions. Water temperature ranged between 22 and 26 degrees C. and water pH between 6.8 and 7.7 during the study period. Statistical analysis was performed using SPSS 14.0, and analysis of covariance (ANCOVA) was used to control for the potentially confounding effect of the days in analysis. Follow-up test of significant ANCOVA effects were compared using the Tukey's "honestly significant difference" (HSD) post hoc test.

Ultrasound Selection Study

The effects of ultrasound on plants include thermal effect and acoustic cavitation. Since the acoustic attenuation of plants was relatively low in the frequency-range tested, 20-kHz, 200-kHz, 500-kHz, 1-MHz, and 2-MHz, as well as the short duration (less than 10 seconds), the thermal effect is considered to be minimal (Fukuhara 2002). Acoustic cavitation (bubble activities under ultrasound) presumably played a primary role in damaging treated plants.

Among all the above tested frequencies, 20-kHz ultrasound of 1.8 MPa acoustic pressure amplitude demonstrated the most severe damage to treated water chestnut. Ruptures of water chestnut petioles was observed immediately after 10 seconds of ultrasound treatment. Treated plants lost all leaves, buoyancy and viability within 24 hours. Under a microscope, cell membrane disruption was observed on treated plants. Similar damage was caused by the other sub-megahertz and megahertz frequencies (200-kHz, 500-kHz, 1-MHz, and 2-MHz), but longer exposure duration, up to two minutes, was needed to produce similar damages on water chestnut plants.

A mechanical index (MI) developed as an indicator for the potential of non-thermal damage caused by acoustic cavitation was further used to verify the results. The MI index is defined as $$MI = \frac{P_r \ (\text{MPa})}{\sqrt{f \ (\text{MHz})}},$$

where $P_r$ is the in situ peak negative acoustic pressure amplitude expressed in MPa and $f$ is the central frequency in MHz (National Council on Radiation Protection and Measurements 2002).

The results showed that the low frequencies used in this study were much below the 1-MHz limit of diagnostic imaging applications. Nevertheless, F ($P_r$, f), that is related to MI, may still be a good indicator for the plant destruction due to acoustic cavitation. This is consistent with our observation; the 20-kHz sound source caused the most severe damage to the plant.

Although the 500-kHz-focused sound field has the highest acoustic pressure amplitude at its focal region, its F ($P_r$, $f$), is still lower than that of 20-kHz, as its frequency is much higher (Table 1). The MI index suggested that 20-kHz ultrasound of 1.8 MPa acoustic pressure amplitude has the highest MI value and can cause the severest damage to plants among the tested ultrasound waves.

Another disadvantage of the 500-kHz-focused sound field is that it is critical to place the plant at its focus to get maximum acoustic pressure amplitude. Since the 500-kHz focal zone is relatively small, it is time-consuming and impractical to use a focused sound field in a large-scale management practice. A 20-kHz, non-focused sound field may provide a more effective management strategy.

Effectiveness of Ultrasound Study

After successfully selecting the optimal ultrasound wave, a study was conducted to determine the optimal aiming location on water chestnuts, the petiole and the stem, and to assess the effectiveness of ultrasound to control water chestnuts.

Aiming ultrasound directly on the central stem of water chestnut plants caused immediate significant damages. The stems ruptured and the leaves gradually detached from the stems. No new leaf production was observed during the 14-day post treatment observation period. Once a water chestnut plant lost all its leaves and buoyancy, a plant was pronounced dead. Fourteen days after ultrasound treatment, the mortality rate of stem treatment reached 97%. Only one out of 30 treated plants was still alive, with only two leaves attached to its central stem (Table 2). This treated plant was observed for two months. Although it did not lose its viability or all the leaves, it was never able to successfully produce seeds, which is the only means of reproduction by this annual plant species. Thus, the results suggest that ultrasound can cause high mortality of water chestnuts by aiming directly on plant stems for 10 seconds under a controlled greenhouse environment.

In the petiole treatment, the treated areas were damaged immediately and turned brown. Leaves broke off from the treated spots or detached from the central stems. Twenty-six of the thirty treated plants lost all their leaves and were not able to produce new leaves by day 14. Those plants were considered dead; the mortality rate of the petiole treatment was observed to be 86.7% at day 14. The remaining four plants lost the majority of leaves with only a total of 11 leaves left among four plants. Ten of the 11 remaining leaves were new growth from the central stems (Table 2). Although the petiole treatment successfully damaged water chestnut petioles, interrupted gas, nutrient and water transport, and resulted in loss of plant leaves, four of the 30 treated plants were able to produce new leaves from the upper portion of the central stems (no seeds were produced during the two-month post treatment observation). Repeated treatments may be necessary or desirable. It should be noted; ultrasound treatment can be used to effectively stunt the growth and effectively reduced the thickness of the plants, thereby reducing the size and density of plant coverage. Thus, ultrasound treatment may likewise be used to reduce the plant coverage in an area in order to allow recreation, allow boats to travel through, or to reduce surface coverage by plants or living matter in an area, thereby allowing sunlight and oxygen to permeate to lower levels in a body of water.

On average, each water chestnut included in this study developed approximately 18 leaves. A total of 36 seconds of ultrasound exposure was required to treat one plant. However, several seconds were required to reposition the ultrasound transducer to aim directly on each plant petiole. Therefore, approximately two minutes were needed to apply ultrasound to a single plant, which is longer than the 10-s exposure duration of the stem treatment. Compared to the petiole treatment, stem treatment demonstrated greater potential and treatment efficiency because 1) the stem may be easier to locate by submersed transducer, 2) less repositioning of the transducer may be needed, and 3) less time is needed to effectively treat the plant.

Water chestnuts in the control (no treatment) group grew during the 14-day observation period. The number of leaves in the control group increased from 18.4 leaves/plant to 22.4 leaves/plant (Table 2), and one additional plant was observed in the control group via vegetative growth. An analysis of co-variance (ANCOVA) was performed to detect significant differences on numbers of leaves of water chestnuts after stem treatment, petiole treatment and control (no treatment) during the study period. The numbers of leaves of water chestnuts significantly different, $F(2,38)=63.231$, $p=0.000$ (Table 3).

Tukey's HSD test indicated that the numbers of leaves of water chestnuts in both stem and petiole treatments are significantly different from the number of leaves of water chestnuts in control (no treatment) (Table 4). A significantly less number of leaves found on both stem treatment ($0.07\pm0.067$) and petiole treatment ($0.37\pm0.195$) than control (no treatment) ($22.4\pm0.403$) at the end of the observation period (Table 2). Although the average number of leaves of the stem treatment was significantly less than that of the petiole treatment, water chestnuts in both stem and petiole treatments were significantly damaged by ultrasound. The control group produced a total of 133 seeds by the end of the two-month post treatment observation period.

TABLE 1

Summary of Characteristics of Sound Sources

| Frequency (Hz) | −6 dB Beam Diameter | Highest Acoustic Pressure Amplitude | $I_{SPPA}$ | $F(P_r, f)$ |
|---|---|---|---|---|
| 20 k | 12 mm | 1.9 MPa | 860 W/cm² | 13.4 |
| 200 k | 12 mm | 1.2 MPa | 340 W/cm² | 2.7 |
| 500 k | 3 mm | 2.8 MPa | 1.9 kW/cm² | 4.0 |
| 1 M | 12 mm | 1.3 MPa | 400 W/cm² | 1.3 |
| 2 M | 12 mm | 1.3 MPa | 400 W/cm² | 0.9 |

TABLE 2

Measurements for average number of leaves per water chestnut plant (n = 30) of petiole treatment, stem treatment and control (no treatment).

| | Initial Mean ± S.E. | Final Mean ± S.E. |
|---|---|---|
| Petiole Treatment | 18.60 ± 0.26 | 0.37 ± 0.20 |
| Stem Treatment | 18.00 ± 0.27 | 0.07 ± 0.07 |
| Control (No Treatment) | 18.40 ± 0.28 | 22.40 ± 0.40 |

TABLE 3

Analysis of variance table for effects of ultrasound on water chestnuts.

| Source | Degrees of freedom (df) | Sum of Squares (SS) | Mean Square (MS) | F-ratio | p-value |
|---|---|---|---|---|---|
| Time | 1 | 512.171 | 512.171 | 29.304 | 0.000 |
| Treatment | 2 | 2210.252 | 1105.126 | 63.231 | 0.000 |
| Residual | 38 | 664.153 | 17.478 | | |
| Total | 42 | 8417.373 | | | |

TABLE 4

Mean differences between all possible pairs of treatments in the feasibility study of ultrasonic treatment of water chestnuts.

| | Control (No Treatment) | Petiole Treatment | Stem Treatment |
|---|---|---|---|
| Control (No Treatment) | 0.000 | | |
| Petiole Treatment | 13.083 (0.000) | 0.000 | |
| Stem Treatment | 16.955 (0.000) | 3.871 (0.000) | 0.000 |

Also assessed were the impacts of ultrasound on fish populations in 90-gallon tanks, each containing six water chestnut plants and 12 minnows—Northern redbelly dace (*Phoxinus eos*) and fathead minnow (*Pimephales promelas*)—averaging 2.3 inches (5.9 cm) in length that were collected locally in Essex County, New York. Ultrasound waves of 20 kHz were emitted into treatment tanks for six continuous hours. Observed were fish mortalities and behaviors every hour during the treatment as well as at 24, 48 and 72 hours after the six-hour ultrasonic treatment. No fish died as a result of either treatment (n=4) or control (n=4) tanks, nor were any abnormal fish behavior observed. The results of this study suggested that the ultrasound emissions can be controlled such that one specie is treated and/or eliminated with other species may remain intact and otherwise unaffected. For example, water chestnut plants may be successfully eradicated by aiming 20 kHz ultrasound waves directly on the plants, while the same ultrasound parameters leave fish populations unaffected and unharmed.

We claim:

1. An apparatus for in situ control of underwater organisms, said apparatus comprising:
   a function generator, for generating an electronic signal;
   a power amplifier, electrically coupled to said function generator, for receiving said electronic signal and amplifying said signal;
   a plurality of transducers, electrically coupled to said power amplifier, for converting said amplified electronic signal to a plurality of ultrasonic waves;
   an immersible support, wherein said plurality of transducers are operatively coupled to said immersible support, wherein each transducer generates at least one of said ultrasound waves, and wherein said ultrasound waves act in concert and have an additive effect to provide a pattern of ultrasound waves larger than an individual ultrasound wave to thereby cover and cause cavitation to a larger in situ target area than an individual ultrasound wave; and
   a transport member, said transport member configured to provide mobility to said apparatus.

2. The apparatus of claim 1, wherein the apparatus further comprises a power source, operatively attached to the apparatus.

3. The apparatus of claim 1, wherein each transducer is a non-focusing piezoelectric element.

4. The method of claim 1, wherein the pattern of ultrasound waves comprises emitting an ultrasound frequency and an ultrasound acoustic pressure for an emission duration.

5. The apparatus of claim 1, wherein the in situ target area comprises at least one living organism.

6. The apparatus of claim 1, wherein the apparatus is completely immersible.

7. The apparatus of claim 1, wherein the immersible support may be selected from the group consisting of: a bar, a tube, an encasing member, and combinations thereof.

8. The apparatus of claim 1, wherein the transport member is selected from the group consisting of: a propeller, a jet, a rotating track, a float, a buoy, and combinations thereof.

9. The apparatus of claim 1, wherein the immersible support further comprises at least one attaching member to removably attach the transducers to the immersible support.

10. The apparatus of claim 1, further comprising an anchor to secure the apparatus to a location.

11. The apparatus of claim 1, further comprising a transceiver, said transceiver configured to transmit information to a remote processor and receive information from said processor.

12. The apparatus of claim 1, further comprising a remote operator, configured to maneuver and control said apparatus from a remote location.

13. The apparatus of claim 1, wherein the plurality of transducers are operatively oriented away from said immersible support during the pattern of ultrasound wave emission.

14. The apparatus of claim 1, wherein the ultrasonic pattern includes an emission duration, an ultrasound wave frequency, an ultrasound wave acoustic intensity, a distance from one or more target, and a combination thereof.

15. A method of treating a target area with an ultrasound wave pattern, comprising:
   providing an ultrasound apparatus having an ultrasound wave generator operatively attached to a plurality of transducers, each of the transducers configured to emit an ultrasound wave, the plurality of transducers coupled to an immersible support, and a transport member, said transport member configured to provide mobility to said apparatus;
   immersing the apparatus into a water environment;
   positioning the apparatus proximate to a target area to treat at least one in situ organism; and;
   emitting a pattern of ultrasound waves from said transducers, said pattern of ultrasound waves acting in concert and having an additive effect as they propagate through said water environment and are emitted onto said target area to treat an in situ underwater organism with an ultrasound wave pattern to cavitate said at least one in situ organism.

16. The method of claim 15, further wherein the step of immersing the apparatus comprises maneuvering the ultrasound apparatus with a transport member to a position beneath the water surface, said transport member attached to said immersible support.

17. The method of claim 15, wherein positioning the apparatus comprises moving the apparatus to a predetermined distance from the target, where the predetermined distance is within the range of the pattern of ultrasound waves emitted by the transducers.

18. The method of claim 15, further wherein emitting the pattern of ultrasound waves comprises emitting a frequency and an acoustic pressure for a predetermined duration onto the at least one organism.

19. The method of claim 15, wherein the method further comprises damaging the in situ targets by acoustic cavitation.

20. The method of claim 15, further comprising transmitting an apparatus information to a central processor for collection and processing.

21. The method of claim 15, wherein the method further comprises repeating positioning and emitting steps of the ultrasound apparatus on the in situ target area until a desired level of treatment is administered.

22. An apparatus for in situ control of underwater organisms, said apparatus comprising:
a function generator, for generating an electronic signal;
a power amplifier, electrically coupled to said function generator, for receiving said electronic signal and amplifying said signal;
a plurality of transducers, electrically coupled to said power amplifier, for converting said amplified electronic signal to a plurality of ultrasonic waves;
an immersible support, wherein said plurality of transducers are operatively coupled to said immersible support, wherein each transducer generates at least one of said ultrasound waves, and wherein said ultrasound waves act in concert and have an additive effect to provide a pattern of ultrasound waves larger than an individual ultrasound wave to thereby cover a larger in situ target area and cavitate said in situ underwater organisms in said target area than an individual ultrasound wave; and
a remote operator, configured to maneuver and control said apparatus remotely.

23. The method of claim 15, wherein said cavitated organism is left in its in situ position and location after cavitation.

24. The apparatus of claim 1, wherein the orientation of said plurality of transducers is capable of being modified so as to dynamically adjust said plurality of ultrasound waves.

25. The method of claim 15, wherein the orientation of said plurality of transducers is capable of being modified so as to dynamically adjust said ultrasound wave pattern to be directed at said in situ organism.

26. The apparatus of claim 22, wherein the orientation of said plurality of transducers is capable of being modified so as to dynamically adjust said plurality of ultrasound waves.

* * * * *